US012566760B2

(12) United States Patent
Mihaylov et al.

(10) Patent No.: US 12,566,760 B2
(45) Date of Patent: Mar. 3, 2026

(54) GLOBAL QUERY OPTIMIZATION

(71) Applicant: International Business Machines Corporation, Armonk, NY (US)

(72) Inventors: Alexandar Mihaylov, Ottawa (CA); Vincent Corvinelli, Mississauga (CA); Calisto Zuzarte, Pickering (CA); Mohammed Fahd Alhamid, Stouffville (CA); Brandon Lewis Frendo, Markham (CA); Ian Richard Finlay, Uxbridge (CA)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 18/449,212

(22) Filed: Aug. 14, 2023

(65) Prior Publication Data

US 2025/0061112 A1 Feb. 20, 2025

(51) Int. Cl.
*G06F 16/2453* (2019.01)
*G06F 16/242* (2019.01)
(52) U.S. Cl.
CPC ...... *G06F 16/24542* (2019.01); *G06F 16/242* (2019.01); *G06F 16/24549* (2019.01)
(58) Field of Classification Search
CPC ............. G06F 16/24542; G06F 16/242; G06F 16/24549; G06F 16/245
USPC ........................................................ 707/718
See application file for complete search history.

(56) References Cited

U.S. PATENT DOCUMENTS

| | | | |
|---|---|---|---|
| 10,496,649 B1 * | 12/2019 | Das ................... | G06F 16/24578 |
| 12,117,980 B1 * | 10/2024 | Chacko .............. | G06F 11/3409 |
| 2005/0223026 A1 * | 10/2005 | Chaudhuri ........ | G06F 16/24556 |
| 2009/0198644 A1 * | 8/2009 | Buchner ............ | G06F 16/3322 |
| 2009/0259624 A1 * | 10/2009 | DeMaris ........... | G06F 16/24534 |
| 2017/0300530 A1 * | 10/2017 | Tang ................. | G06F 16/24578 |
| 2019/0251125 A1 * | 8/2019 | Song ................. | G06F 16/90324 |
| 2022/0004553 A1 | 1/2022 | Corvinelli et al. | |
| 2023/0153303 A1 * | 5/2023 | Doshi ............... | G06F 16/24542 707/718 |
| 2023/0267148 A1 * | 8/2023 | Kotha .............. | G06F 16/24542 707/713 |

FOREIGN PATENT DOCUMENTS

CN 112988802 A 6/2021

OTHER PUBLICATIONS

Anonymous, "Adaptive Query Optimization," Oracle SQL & PL/SQL Optimization for Developers, URL: https://oracle.readthedocs.io/en/stable/sql/plans/adaptive-query-optimization.html?highlight=Adaptive%20Query%20Optimization, Retrieved: May 2, 2023, 2 pages.

(Continued)

*Primary Examiner* — Hares Jami
(74) *Attorney, Agent, or Firm* — CANTOR COLBURN LLP; Stephen Yoder

(57) ABSTRACT
Techniques are provided for global query optimization. In one embodiment, the techniques involve receiving an input query, generating query candidates based on the input query, determining ratings of the query candidates, selecting a primary query of the query candidates based on the ratings of the query candidates, comparing a rating of the primary query to a query threshold, and generating a recommended query based on the rating.

25 Claims, 6 Drawing Sheets

(56)　　　　　References Cited

OTHER PUBLICATIONS

Damasio et al., "Guided automated learning for quiery workload re-optimization," arXiv:1904.02049v3, May 22, 2019, 13 pages.

Damasio et al., "Query Performance Problem Determination with Knowledge Base in Semantic Web Sytstem Optimatch," Proc. 19th International Conference on Extending Database Technology, Mar. 15-18, 2016, pp. 515-526.

Kumar, "Adaptive Query Processing in SQL Server," Database Journal, May 21, 2018, 6 pages.

Marcus et al., "Bao: Making Learned Query Optimization Practical," SIGMOD, Jun. 20-25, 2021, 14 pages.

Marcus et al., "Neo: A Learned Query Optimizer," arXiv:1904. 03711v1, Apr. 7, 2019, 18 pages.

Mihaylov, "DistGALO: Distributed System for Query Problem Determination," Thesis, Ontario Tech University, Dec. 2019, 88 pages.

Ramadan et al., "RL_QOptimizer: A Reinforcement Learning Based Query Optimizer," IEEE Access, vol. 10, 2022, pp. 70502-70515.

Stillger et al., "LEO—DB2's LEarning Optimizer," Proceedings of the 27th VLDB Conference, 2001, 10 pages.

Zaghloul et al., "A new framework based on features modeling and ensemble learning to predict query performance," PLOS One 16(10), e0258439, Oct. 18, 2021, pp. 1-18.

Zahir et al., "A Recommendation System for Execution Plans Using Machine Learning," Mathematical and Computational Applications, 2016, pp. 1-13.

Zahir et al., "Access Plan Recommendation Using SQL Queries Similarity," WSEAS Transactions on Computers, vol. 14, Jan. 2015, pp. 638-645.

Zhu et al., "Lero: A Learning-to-Rank Query Optimizer," Proceedings of the VLDB Endowment, vol. 16, No. 6, 2023, 15 pages.

* cited by examiner

100

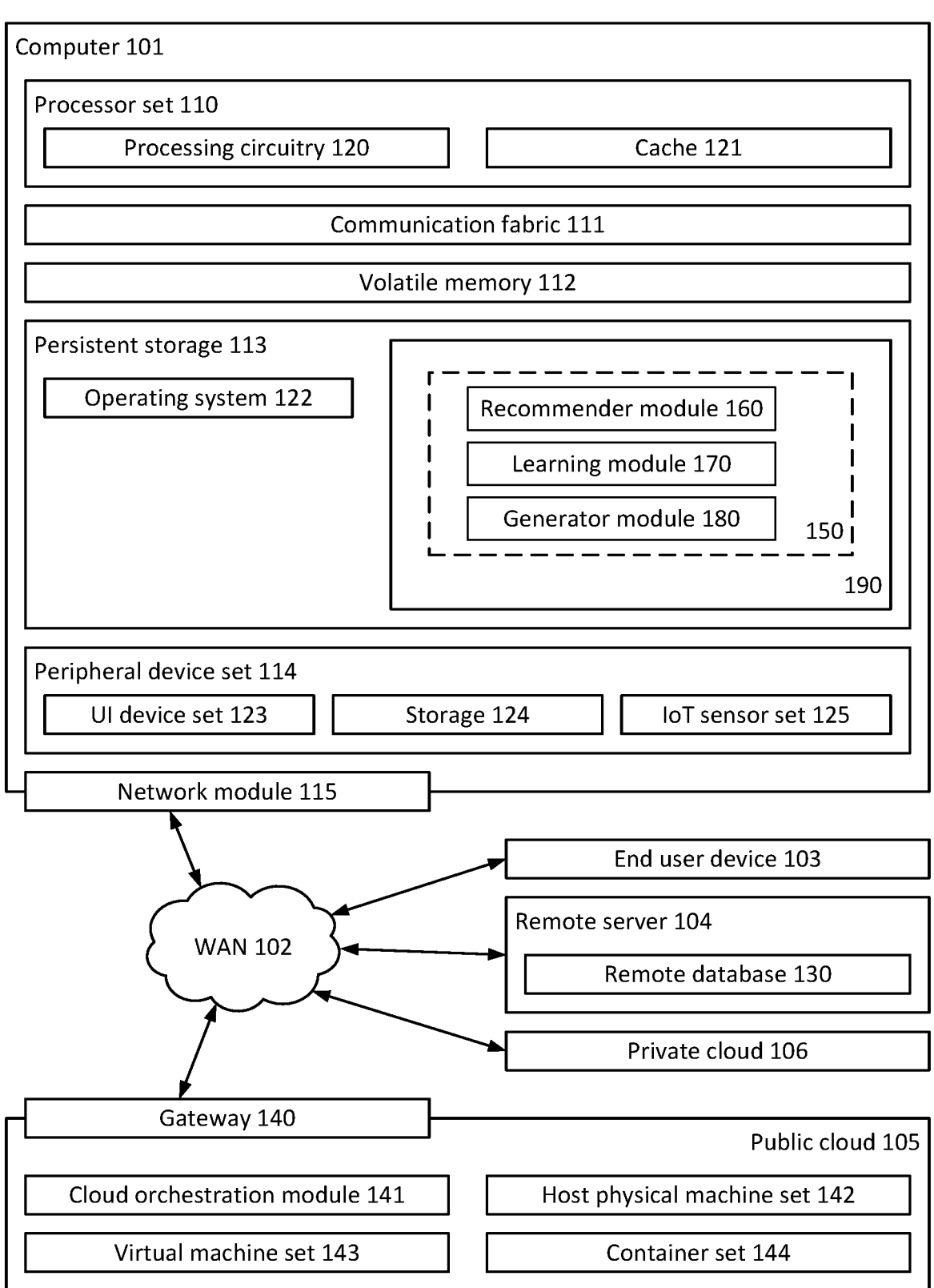

Computer 101

Processor set 110

Processing circuitry 120    Cache 121

Communication fabric 111

Volatile memory 112

Persistent storage 113

Operating system 122

Recommender module 160

Learning module 170

Generator module 180

150

190

Peripheral device set 114

UI device set 123    Storage 124    IoT sensor set 125

Network module 115

WAN 102

End user device 103

Remote server 104

Remote database 130

Private cloud 106

Gateway 140

Public cloud 105

Cloud orchestration module 141    Host physical machine set 142

Virtual machine set 143    Container set 144

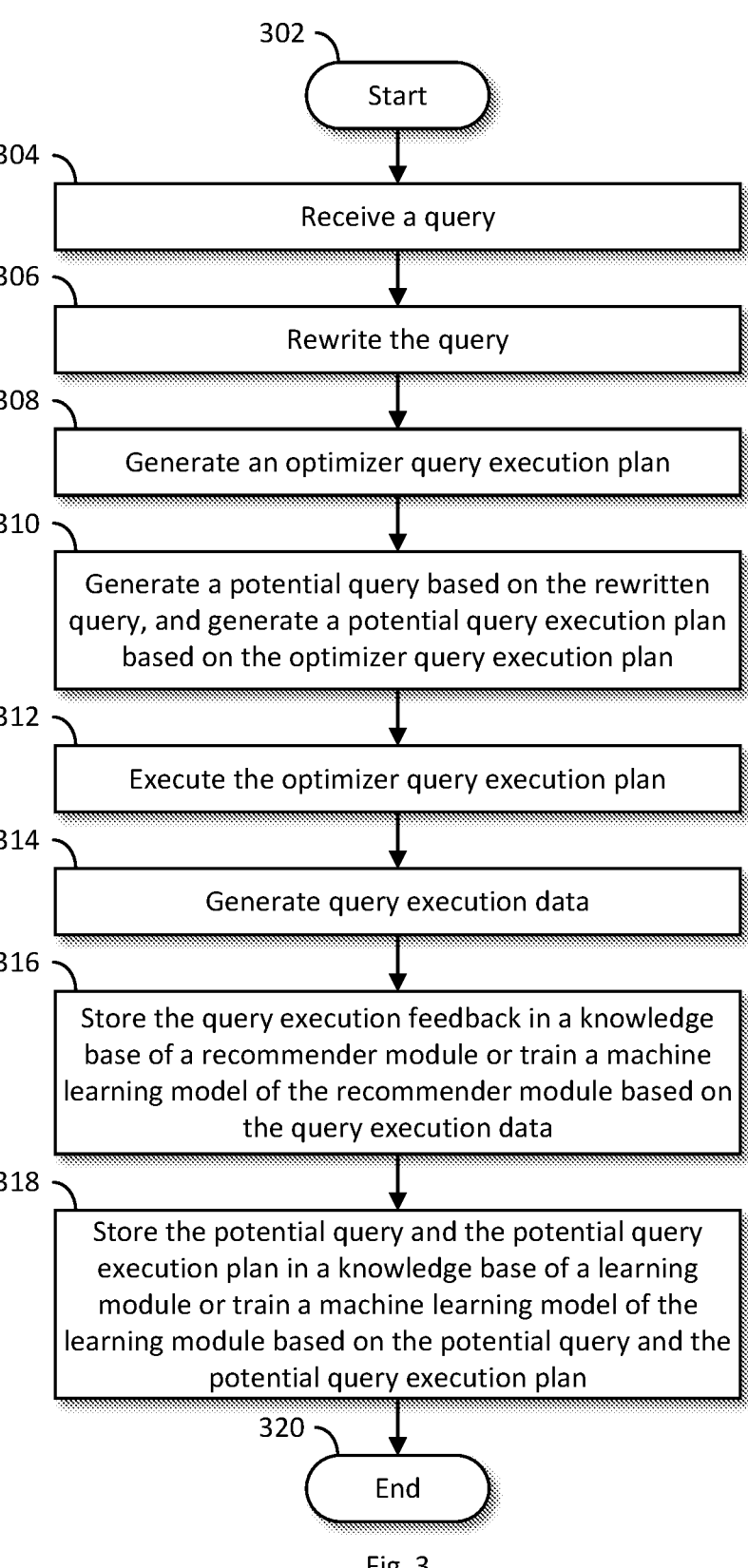

302

Start

304

Receive a query

306

Rewrite the query

308

Generate an optimizer query execution plan

310

Generate a potential query based on the rewritten query, and generate a potential query execution plan based on the optimizer query execution plan

312

Execute the optimizer query execution plan

314

Generate query execution data

316

Store the query execution feedback in a knowledge base of a recommender module or train a machine learning model of the recommender module based on the query execution data

318

Store the potential query and the potential query execution plan in a knowledge base of a learning module or train a machine learning model of the learning module based on the potential query and the potential query execution plan

320

End

GLOBAL QUERY OPTIMIZATION

BACKGROUND

The present disclosure relates to database management systems, and more specifically, to using execution data to provide global query optimization.

Traditional query optimization processes aim to reduce the resources and time needed to execute a query. These processes generally involve parsing and analyzing the query for relationships and operations, transforming the query into a simpler form, estimating the resource and time cost of different query execution plans, and executing the plan with the lowest cost. However, traditional query optimization processes are limited to data available at the time of execution, which may provide sub-optimal global query optimization.

SUMMARY

A method is provided according to one embodiment of the present disclosure. The method includes receiving an input query; generating query candidates based on the input query; determining ratings of the query candidates; selecting a primary query of the query candidates based on the ratings of the query candidates; comparing a rating of the primary query to a query threshold; and generating a recommended query based on the rating.

A system is provided according to one embodiment of the present disclosure. The system includes a processor; and memory or storage comprising an algorithm or computer instructions, which when executed by the processor, performs an operation that includes: receiving an input query; generating query candidates based on the input query; determining ratings of the query candidates; selecting a primary query of the query candidates based on the ratings of the query candidates; comparing a rating of the primary query to a query threshold; and generating a recommended query based on the rating.

A computer-readable storage medium having computer-readable program code embodied therewith, the computer-readable program code executable by one or more computer processors to perform an operation, is provided according to one embodiment of the present disclosure. The operation includes receiving an input query; generating query candidates based on the input query; determining ratings of the query candidates; selecting a primary query of the query candidates based on the ratings of the query candidates; comparing a rating of the primary query to a query threshold; and generating a recommended query based on the rating.

A system is provided according to one embodiment of the present disclosure. The system includes a processor; and memory or storage comprising an algorithm or computer instructions, which when executed by the processor, performs an operation that includes: generating query execution plan candidates based on a recommended query; rating the query execution plan candidates; selecting a primary query execution plan of the query execution plan candidates based on the ratings of the query execution plan candidates; comparing a rating of the primary query execution plan to a plan threshold; and generating a runtime query execution plan based on the rating.

A computer-readable storage medium having computer-readable program code embodied therewith, the computer-readable program code executable by one or more computer processors to perform an operation, is provided according to one embodiment of the present disclosure. The operation includes generating query execution plan candidates based on a recommended query; rating the query execution plan candidates; selecting a primary query execution plan of the query execution plan candidates based on the ratings of the query execution plan candidates; comparing a rating of the primary query execution plan to a plan threshold; and generating a runtime query execution plan based on the rating.

BRIEF DESCRIPTION OF THE DRAWINGS

FIG. 1 illustrates a computing environment, according to one embodiment.

FIG. 3 illustrates a flowchart of a method of initializing a global query optimization environment, according to one embodiment.

DETAILED DESCRIPTION

Figure 2:
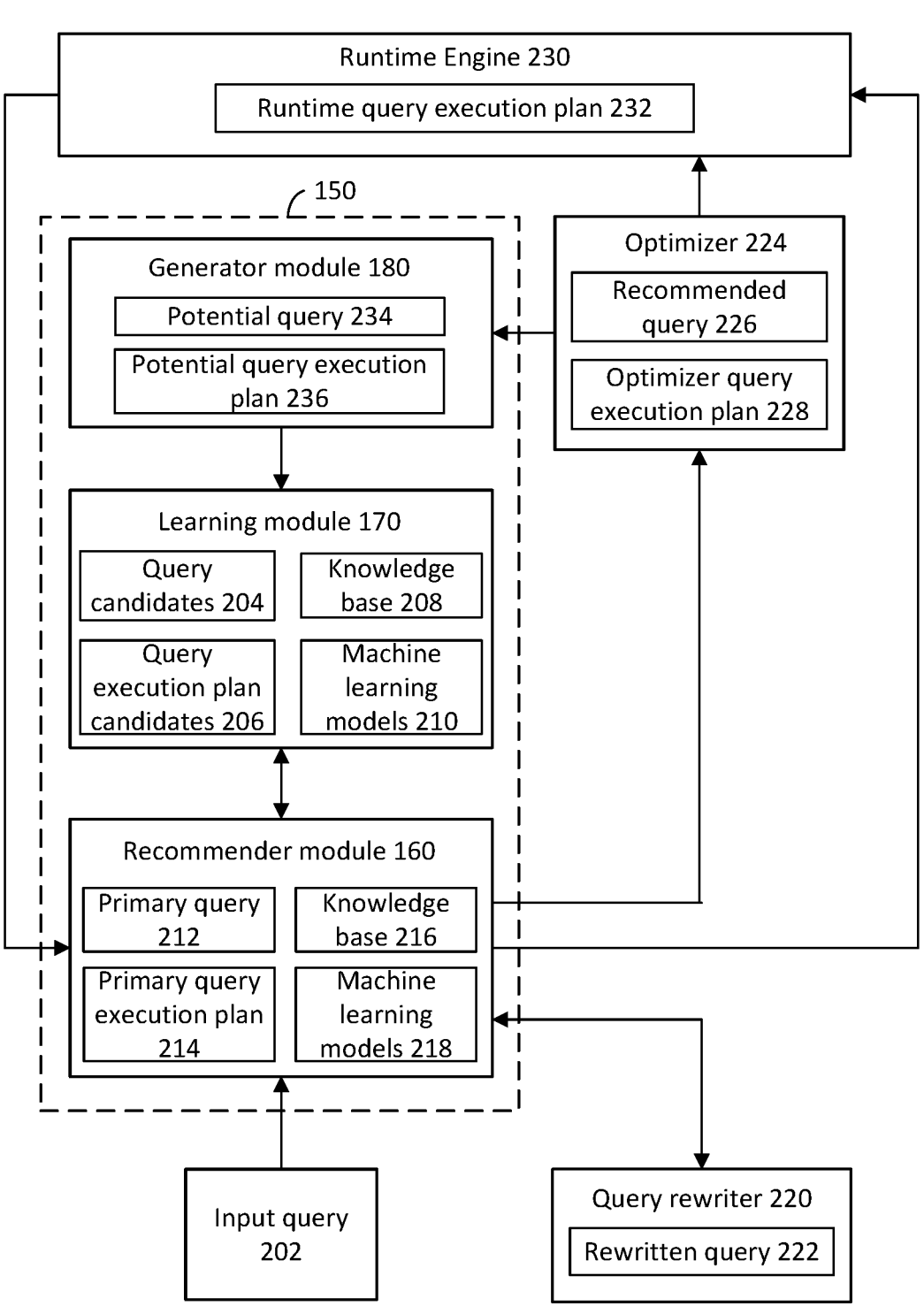
FIG. 2 illustrates a global query optimization environment, according to one embodiment.

Embodiments of the present disclosure improve upon global query optimization techniques by providing a global query optimization module that uses present query execution data and historical query execution data to optimize query transformations and query execution plans (QEPs). In one embodiment, the global query optimization module parses and analyses a query to generate query transformation candidates (hereinafter referenced as "query candidates"). The query candidates are ranked based on the query execution data. The global query optimization module can select a query candidate with a rating that exceeds a query threshold, or use a rewritten query, to generate QEP candidates. The global query optimization module can then rate the QEP candidates based on the query execution data, and select a QEP candidate with a rating that exceeds a plan threshold. Afterwards, a runtime engine can execute the selected QEP candidate and update the query execution data. Whenever the selected QEP candidate does not exceed the plan threshold, an optimizer can produce another QEP. The runtime engine can then execute the optimizer-produced QEP, and update the query execution data. Further, the global query optimization module can, in parallel with the aforementioned operations, generate additional queries and QEPs, and associate the additional queries and QEPs with respective query candidates and QEP candidates for future query optimization processes.

One benefit of the disclosed embodiments is to compensate for sub-optimal transformed queries and QEPs that may be selected by an optimizer. Further, embodiments of the present disclosure can learn from previous query executions to optimize query transformation and QEP formation processes and outputs, which can reduce the time and resources required to execute the query.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 illustrates a computing environment 100, according to one embodiment. Computing environment 100 contains an example of an environment for the execution of at least some of the computer code involved in performing the inventive methods, such as a new global query optimization module 150, which includes a recommender module 160, a learning module 170, and a generator module 180, shown in block 190. In addition to block 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in block 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 illustrates a global query optimization environment 200, according to one embodiment. In the illustrated embodiment, the global query optimization environment 200 includes an input query 202, the global query optimization module 150, a query rewriter 220, an optimizer 224, and a runtime engine 230.

The input query 202 can represent a request for information from a database. The input query 202 may include attributes, clauses, identifiers, keywords, operators, predicates, or the like. In one embodiment, the input query 202 is input into the global query optimization module 150, which can reduce the time and resources needed to execute the query.

As shown in FIG. 1, the persistent storage 113 can include the global query optimization module 150, which includes a recommender module 160, a learning module 170, and a generator module 180. In one embodiment, the global query optimization module 150, the recommender module 160, the learning module 170, and the generator module 180 represent one or more algorithms, instruction sets, software applications, or other computer-readable program code that can be executed by the processor set 110 to perform the functions, operations, or processes described herein.

In one embodiment, the input query 202 is received at the recommender module 160. The recommender module 160 can include a knowledge base 216, or at least one machine learning model. The recommender can parse queries, extract features from the queries, rank the queries, and determine whether the queries meet given thresholds. Further, the recommender module 160 can parse query execution plans (QEPs), extract features from the QEPs, rank the QEPs, and determine whether the QEPs meet given thresholds. The recommender can also receive queries and runtime execution data as inputs. These processes are described further in FIGS. 4-5 below.

The recommender module 160 can submit a request to the learning module 170 to generate query candidates 204. The learning module 170 can include a knowledge base 208, or at least one machine learning model, that is used to generate query candidates 204 and QEP candidates 206 that correspond to the input query 202. The query candidates 204 and the QEP candidates 206 can represent queries and QEPs determined from optimized, previous query executions. These processes are described further in FIGS. 3-5 below.

In one embodiment, the recommender module 160 rates the query candidates 204 using query execution data from the runtime engine 230. The recommender module 160 then compares the ratings to a query threshold to determine a recommended query 226 (i.e., a recommended query transformation), which represents either a primary query 212 (i.e., a primary query transformation) or a rewritten query 222. When at least one rating of the query candidates 204 exceeds the query threshold, the highest-rated query candidate can be used as the primary query 212. When none of the ratings exceed the query threshold, the recommender module 160 can use the query rewriter 220 to generate the rewritten query 222. These processes are described further in FIG. 4.

The recommender module 160 can submit a request to the learning module 170 to generate QEP candidates 206 using the recommended query 226. In one embodiment, the recommender module 160 rates the QEP candidates 206 using query execution data from the runtime engine 230. The recommender module 160 then compares the ratings to a plan threshold to determine a runtime QEP 232, which represents either a primary QEP 214 or an optimizer QEP 228. When at least one rating of the QEP candidates 206 exceeds the plan threshold, the highest-rated QEP candidate 206 can be used as the primary QEP 214. When none of the ratings exceed the plan threshold, the recommender module 160 can use the optimizer 224 to generate the optimizer QEP 228. These processes are described further in FIG. 5.

When the runtime QEP 232 is the optimizer QEP 228, the generator module 180 can generate at least one potential query 234 and potential QEP 236. In one embodiment, the potential queries and potential QEPs represent variations and alternatives of the respective recommended query 226 and optimizer QEP 228, which can be entered into a pool of queries and QEPs used by the learning module 170 to generate the query candidates 204 and QEP candidates 206. These processes are described further in FIG. 5

The runtime engine 230 can execute the runtime QEP 232, and generate the query execution data. The query execution data can represent information about time and resource usage statistics related to executing a query, which can reveal inefficiencies in a query or QEP. The query execution data can include an actual or estimated execution time of a query, an actual or estimated resource (e.g., CPU, GPU, memory) usage of an execution of the query, an actual or estimated resource usage delay (e.g., waiting periods for disk access, or processor availability) of the execution of the query, query execution statistics (e.g., a frequency of disk reads/writes, a number of rows processed, stream size, and stream width, or indexes used or not used), or the like. In one embodiment, the query execution data is used to determine query ratings and QEP ratings of the recommender module 160, as well as to train machine learning models 218 of the recommender module 160 and the machine learning models 210 of the learning module 170. These processes are described further in FIGS. 4-6.

FIG. 3 illustrates a flowchart of a method 300 of initializing a global query optimization environment 200, according to one embodiment. Initializing the global query optimization environment 200 can involve generating starting content and values of query execution data, the knowledge bases and machine learning models of the recommender module 160 and the learning module 170, or the like. In one embodiment, the global query optimization environment 200 is initialized with predetermined query execution data values, predetermined knowledge base content, and pre-trained machine learning models, or the like.

In the illustrated embodiment, the global query optimization environment 200 is initialized using a global query optimization module 150 (which includes a recommender module 160, a learning module 170, and a generator module 180), a query rewriter 220, an optimizer 224, and a runtime engine 230. The method 300 begins at block 302.

At block 304, the global query optimization module 150 receives a query. In one embodiment, the global query optimization module 150 parses, analyzes, and converts the query into a database language representation. The database language representation may include low-level expressions that represent elements or operations of the input query 202 that can be processed at the physical level of a file system of the computer 101. The global query optimization module 150 can check the syntax and semantics of the query to determine operations, data, predicates, or the like, of the query that can be translated into the database language representation. As used herein, references to a "query" may represent a request for information from a database, or an equivalent database language representation.

At block 306, the query rewriter 220 rewrites the query. In one embodiment, the query rewriter 220 rewrites the query into a rewritten query 222, which is equivalent to the query (i.e., the query and the rewritten query 222 return the same results when executed), but may be executed by the runtime engine 230 with greater efficiency. To generate the rewritten query 222, the query rewriter 220 may implement predefined rules or heuristics using to apply general optimizations to the input query 202.

At block 308, the optimizer 224 generates an optimizer query execution plan 228. In one embodiment, the optimizer 224 analyzes the rewritten query 222 to generate multiple query execution plans (QEPs). The QEPs may be optimized based on index selections, join reordering operations, join algorithms selections, or the like. Each QEP represents a sequence of steps that can be performed to execute the rewritten query 222.

In one embodiment, the optimizer 224 determines a cost estimate for each of the QEPs, and selects the QEP with the lowest cost estimate. A cost estimate can represent a determination of the time and resources needed to execute the rewritten query 222. The cost estimate may include data concerning processor usage, memory usage, index usage, operation complexity (e.g., join complexities, filtering conditions, etc.), network traffic, the indexes used to search databases, the number of rows in queried datasets, the distribution of data in queried datasets, or the like.

At block 310, the generator module 180 generates a potential query 234 based on the rewritten query 222, and generates a potential query execution plan 236 based on the optimizer query execution plan 228. In one embodiment, the generator module 180 performs search and explore techniques (e.g., random search, heuristic search, reinforcement learning, or the like) to generate multiple alternatives and variations of the rewritten query 222 and the QEP. In another embodiment, the generator module 180 is a generative AI trained to generate multiple probable alternatives and variations of the rewritten query 222 and the QEP.

Each of the alternatives and variations of the rewritten query 222 and the optimizer query execution plan 228 can be used as a respective potential query 234 and potential QEP 236. In one embodiment, the potential queries and potential QEPs are added to a pool of queries and QEPs. The learning module 170 can use the potential queries and potential QEPs of the pool as query candidates 204 and QEP candidates 206. The query candidates 204 and QEP candidates 206 are described further in FIG. 4.

At block 312, the runtime engine 230 executes the optimizer query execution plan 228. In one embodiment, the runtime engine 230 retrieves, and operates on, data of a database in accordance with steps outlined in the QEP. The runtime engine 230 may, for example, identify data using an index, apply filters to the data, perform join operations, or the like, to generate results that are returned to a submitter of the query.

At block 314, the runtime engine 230 generates query execution data. The query execution data can represent information about time and resource usage statistics related to executing a query, which can reveal inefficiencies in a query or QEP. The query execution data can include an actual or estimated execution time of a query, an actual or estimated resource (e.g., CPU, GPU, memory) usage of an execution of the query, an actual or estimated resource usage delay (e.g., waiting periods for disk access, or processor availability) during the execution of the query, query execution statistics (e.g., a frequency of disk reads/writes, a number of rows processed, stream size, and stream width, or indexes used or not used), or the like.

At block 316, the recommender module 160 stores the execution data in a knowledge base 216, or trains a machine learning model based on the query execution data. As previously discussed, the recommender module 160 can rate the query candidates 204 generated by the learning module 170.

In one embodiment, the recommender module 160 rates each of the query candidates 204 and QEP candidates 206 on each element of the query execution data. For example, each element may be rated from 1-10, where a larger number indicates better performance. Lower time costs and resource costs, for instance, can indicate a higher rating. The recommender module 160 may use a weighted average of the rating of each element to determine the rating of a given query candidate or QEP candidate.

The ratings and corresponding query candidates 204 or QEP candidates 206 can be stored in the knowledge base 216 to aid in determining the ratings of future query executions. The ratings and corresponding query candidates 204 or QEP candidates can also be used to train machine learning models 218 of the recommender module 160 to determine relationships between the ratings and the query candidates 204. In this manner, the machine learning models 218 may output a rating of a given query input or plan input.

At block 318, the learning module 170 stores the potential query 234 and the potential query execution plan 236 in a knowledge base 208, or trains a machine learning model based on the potential query 234 and the potential query execution plan 236. As discussed above, the learning module 170 can use the potential query 234 and the potential QEP 236 stored in the knowledge base 208 to generate future query candidates 204 and QEP candidates 206. These processes are discussed further in FIGS. 4-5.

The potential query 234 and the potential QEP 236 can also be used to determine relationships between the potential query 234 and the potential QEP 236 and a given query input. In this manner, the machine learning models 210 of the learning module 170 may output query candidates 204 or QEP candidates 206 of a given query input or plan input. Processes involving the knowledge base 208 and the machine learning models 210 of the learning module 170 are discussed further in FIGS. 4-5. The method 300 ends at block 320.

Figure 4:
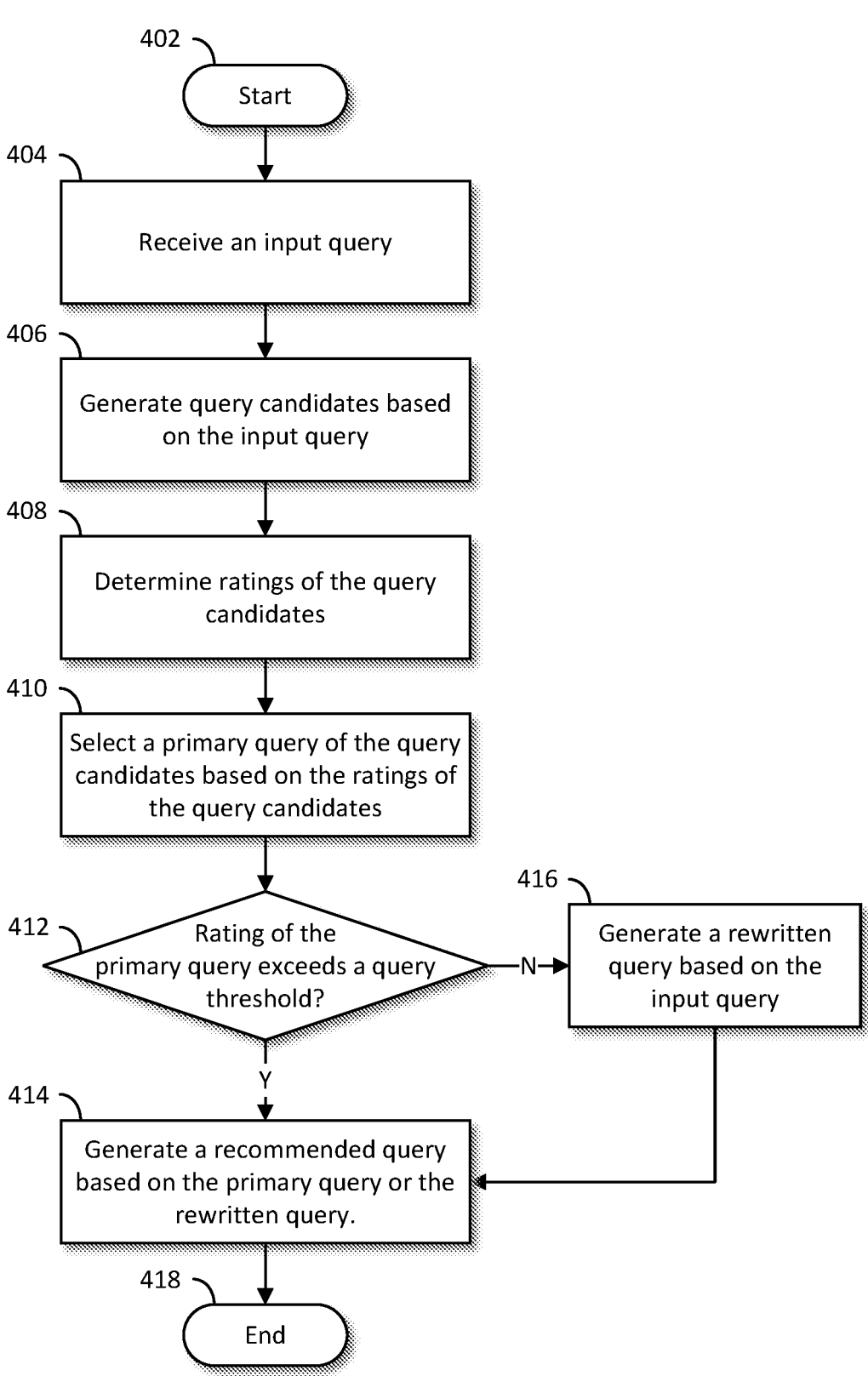
FIG. 4 illustrates a flowchart of a method of generating a recommended query, according to one embodiment.

FIG. 4 illustrates a flowchart of a method 400 of generating a recommended query 226, according to one embodiment. The method 400 begins at block 402.

At block 404, the recommender module 160 receives an input query 202. The input query 202 may be input into the global query optimization environment by a user using the computer 101 or another device.

In one embodiment, the recommender module 160 includes a knowledge base 216, or at least one machine learning model, that is used to parse and analyze the input query 202, and convert the input query 202 into a database language representation. As previously discussed, the database language representation may include low-level expressions that represent elements or operations of the input query 202 that can be processed at the physical level of a file system of the computer 101.

The recommender module 160 can store the query execution data of previous query executions in the knowledge base 216, or use the query execution data from the runtime engine 230 to train the machine learning models 218. In one embodiment, the recommender module 160 uses the knowledge base 216 to provide a database language representation of the input query 202 by matching the input query 202 to a previous query determined from the query execution data in the knowledge base 216. The recommender module 160 can then use a corresponding database language representation of the previous query as the database language representation of the input query 202.

The recommender module 160 can also use the machine learning models 218 to provide a database language representation of the input query 202 by determining a similarity between the input query 202 and a previous query, and using a corresponding database language representation of the previous query as the database language representation of the input query 202.

Afterwards, the recommender module 160 can transmit the database language representation of the input query 202 to the learning module 170. As used herein, references to a "query" may represent a request for information from a database, or an equivalent database language representation.

At block 406, the learning module 170 generates query candidates 204 based on the input query 202. In one embodiment, the learning module 170 includes a knowledge base 208, or at least one machine learning model, that is used to generate query candidates 204 that correspond to the input query 202.

The query candidates 204 can represent queries determined from optimized, previous query executions. In one embodiment, the learning module 170 uses the knowledge base 208 to generate the query candidates 204 by matching the input query 202 (or a transformation of the input query 202) to at least one potential query 234 of the generator module 180, and using a set of the matched potential queries as the query candidates 204.

In addition, or in lieu of using knowledge base 208 to generate the query candidates 204, the learning module 170 can use the machine learning models 210 to generate the query candidates 204 by determining a similarity between the input query 202 (or a transformation of the input query 202) and at least one potential query 234. The learning module 170 can then use a set of the potential queries, which share the similarity, as the query candidates 204.

The learning module 170 can use the query candidates 204 to update the machine learning models 210 of the learning module 170 to aid in determining the future query candidates. The learning module 170 can also transmit the query candidates 204 to the recommender module 160.

At block 408, the recommender module 160 determines ratings of the query candidates 204. In one embodiment, the recommender module 160 uses the knowledge base 216 to retrieve ratings of the query candidates 204 that were previously stored in the knowledge base 216.

The recommender module 160 can also determine ratings of the query candidates 204 using a process similar to the process discussed at block 316 of FIG. 3 above. The newly determined ratings and the corresponding query candidates 204 can be stored in the knowledge base 216 to aid in rating future query candidates. The newly determined ratings can also be used to update the machine learning models 218 of the recommender module 160 to aid in determining the ratings of future query candidates.

The recommender module 160 can also use the machine learning models 218 to determine the ratings by generating a probability distribution of ratings of each query candidate based on ratings of queries that share features with the query candidate 204. The recommender module 160 can use the highest rating in the probability distribution as the rating for a respective query candidate.

At block 410, the recommender module 160 selects a primary query 212 of the query candidates 204 based on the ratings of the query candidates 204. In one embodiment, the query candidate with the highest rating (e.g., the most optimized query of the query candidates 204) is selected as the primary query 212.

At block 412, the recommender module 160 determines whether a rating of the primary query 212 exceeds a query threshold. The query threshold can be a predetermined value that can ensure a level of optimization of the primary query 212.

Upon determining that the rating of the primary query 212 exceeds the query threshold, the method 400 proceeds to block 414, where the recommender module 160 generates a recommended query 226 based on the primary query 212 or a rewritten query 222. When the primary query 212 exceeds the query threshold, the primary query 212 is used as the recommended query 226.

Returning to block 412, upon determining that the rating of the primary query 212 does not exceed the query threshold, the method 400 proceeds to block 416. At block 416, the query rewriter 220 generates the rewritten query 222 based on the input query 202. The query rewriter 220 can rewrite the input query 202 using a process similar to the process discussed at block 306 of FIG. 3.

The method 400 then proceeds to block 414. At block 414, when the primary query 212 does not exceed the query threshold (at block 412), the rewritten query 222 is used as the recommended query 226. In one embodiment, the recommender module 160 transmits the recommended query 226 to the learning module 170 to generate QEP candidates 206 as discussed in FIG. 5. The method 400 ends at block 418.

Figure 5:
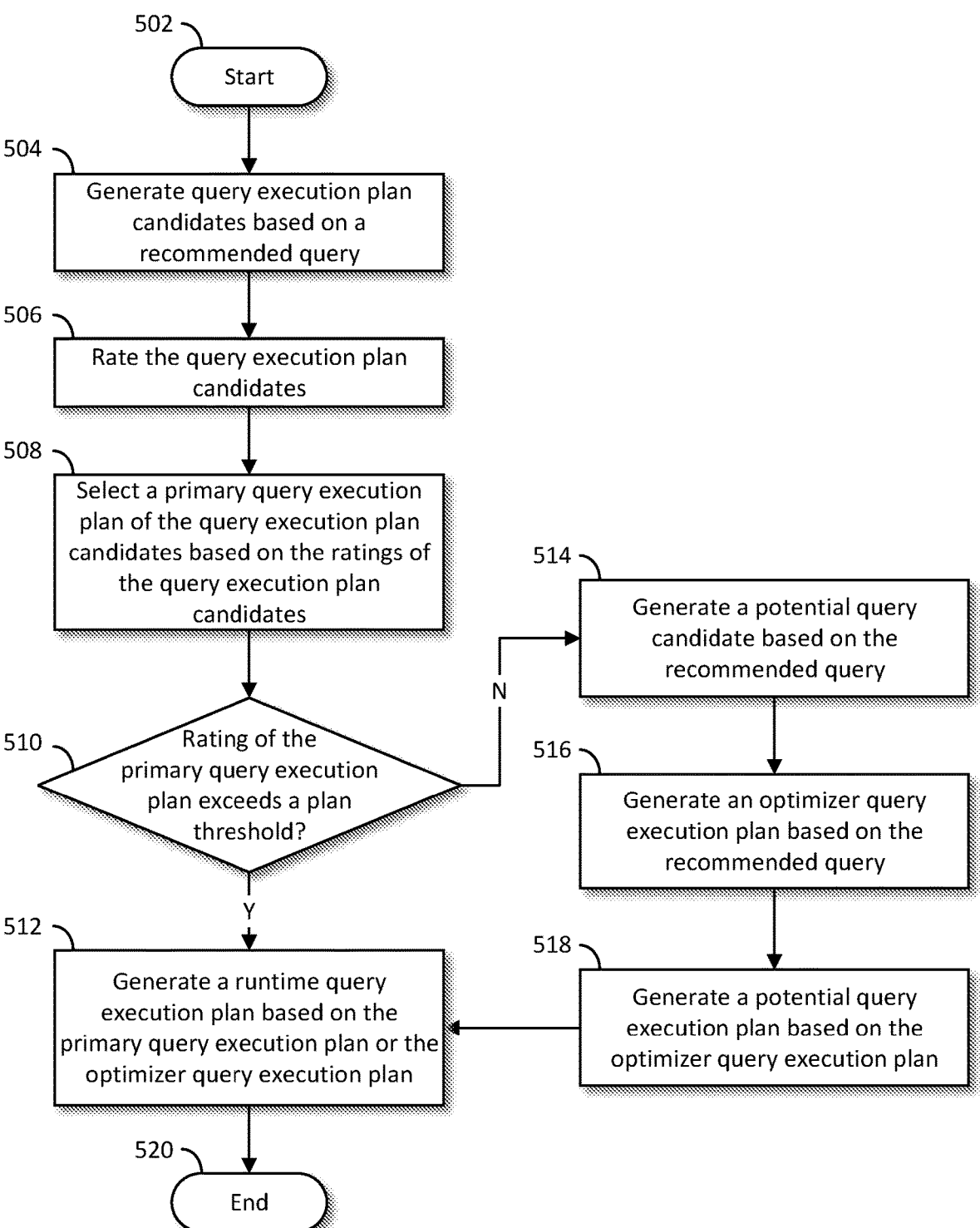
FIG. 5 illustrates a flowchart of a method of generating a runtime query execution plan, according to one embodiment.

FIG. 5 illustrates a flowchart of a method 500 of generating a runtime query execution plan 232, according to one embodiment. The method 500 begins at block 502.

At block 504, the learning module 170 generates query execution plan candidates 206 based on a recommended query 226. As previously discussed, the recommended query 226 can represent either the primary query 212 or the rewritten query 222.

In one embodiment, the learning module 170 uses the knowledge base 208 to generate the QEP candidates 206 by matching the recommended query 226 to at least one potential QEP 236 of the generator module 180, and using a set of the matched potential QEPs as the QEP candidates 206.

In addition, or in lieu of using knowledge base 208 to generate the QEP candidates 206, the learning module 170 can use the machine learning models 210 to generate the QEP candidates 206 by determining a similarity between the recommended query 226 and at least one potential QEP 236 of the knowledge base 208. The learning module 170 can then use a set of the potential QEPs, which share the similarity, as the QEP candidates 206.

The learning module 170 can use the QEP candidates 206 to update the machine learning models 210 of the learning module 170 to aid in determining the future QEP candidates. In one embodiment, the learning module 170 transmits the QEP candidates 206 to the recommender module 160.

At block 506, the recommender module 160 rates the query execution plan candidates 206. In one embodiment, the recommender module 160 uses the knowledge base 216 to retrieve ratings of the QEP candidates 206 that were previously stored in the knowledge base 216.

The recommender module 160 can also determine the ratings of the QEP candidates 206 using a process similar to the process discussed at block 316 of FIG. 3 above. The determined ratings and the corresponding QEP candidates 206 can be stored in the knowledge base 216 to aid in rating future QEP candidates.

The recommender module 160 can also use the machine learning models 218 to determine the ratings by generating a probability distribution of ratings of each QEP candidate based on ratings of QEPs that share features with the QEP candidates 206. The recommender module 160 can use the highest rating in the probability distribution as the rating for a respective QEP candidate. In one embodiment, the selected rating can also be used to update the machine learning models 218 of the recommender module 160 to aid in determining the ratings of future QEP candidates.

At block 508, the recommender module 160 selects a primary query execution plan 214 of the query execution plan candidates 206 based on the ratings of the query execution plan candidates 206. In one embodiment, the QEP candidate with the highest rating (e.g., the most optimized QEP of the QEP candidates 206) is selected as the primary QEP 214.

At block 510, the recommender module 160 determines whether a rating of the primary query execution plan 214 exceeds a plan threshold. The plan threshold can be a predetermined value that can ensure a level of optimization of the primary QEP 214.

Upon determining that the rating of the primary QEP 214 exceeds the plan threshold, the method 500 proceeds to block 512, where the recommender module 160 or the optimizer 224 generates a runtime query execution plan 232 based on the primary QEP 214 or the optimizer query execution plan 228. When the primary QEP 214 exceeds the plan threshold, the primary QEP 214 is used as the runtime QEP 232.

Returning to block 510, upon determining that the rating of the primary QEP 214 does not exceed the plan threshold, the method 500 proceeds to block 514. At block 514, the generator module 180 generates a potential query 234 based on the recommended query 226. The potential query 234 can be generated using a process similar to the process discussed at block 310 of FIG. 3.

At block 516, the optimizer 224 generates an optimizer query execution plan 228 based on the recommended query 226. In one embodiment, the optimizer QEP 228 represents the lowest cost plan of alternatives QEPs generated by the optimizer 224. The optimizer QEP 228 can be generated using a process similar to the process discussed at block 308 of FIG. 3.

At block 518, the generator module 180 generates a potential query execution plan 236 based on the optimizer query execution plan 228. The potential QEP 236 can be generated using a process similar to the process discussed at block 310 of FIG. 3.

The method 500 then proceeds to block 512, where the recommender module 160 or the optimizer 224 generates the runtime query execution plan 232. In one embodiment, when the primary QEP 214 does not exceed the plan threshold (at block 510), the optimizer QEP 228 is used as the runtime QEP 232. The method 500 ends at block 520.

Figure 6:
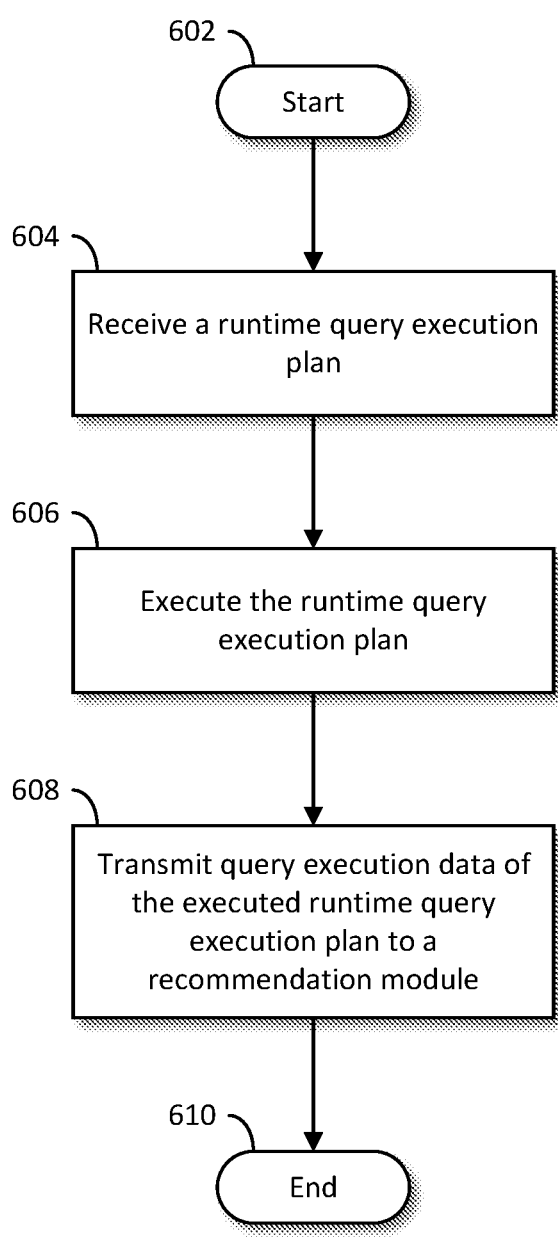
FIG. 6 illustrates a flowchart of a method of executing a runtime query execution plan, according to one embodiment.

FIG. 6 illustrates a flowchart of a method 600 of executing a runtime query execution plan 232, according to one embodiment. The method 600 begins at block 602.

At block 604, the runtime engine 230 receives a runtime query execution plan 232. As previously discussed, the runtime QEP 232 may be one of: the primary QEP 214 or the optimizer QEP 228.

At block 606, the runtime engine 230 executes the runtime query execution plan 232. In one embodiment the runtime QEP 232 includes a sequence of operations that can be performed to retrieve, modify, and operate on data in order to generate results of the input query 202.

During the execution of the runtime QEP 232, the runtime engine 230 can collect and otherwise determine query execution data of the runtime QEP 232. The query execution data can represent information about time and resource usage statistics related to executing a query, which can reveal inefficiencies in a query or QEP. The query execution data can include an actual or estimated execution time of a query, an actual or estimated resource (e.g., CPU, GPU, memory) usage of an execution of the query, an actual or estimated resource usage delay (e.g., waiting periods for disk access, or processor availability) of the execution of the query, query execution statistics (e.g., a frequency of disk reads/writes, a number of rows processed, stream size, and stream width, or indexes used or not used), or the like.

At block 608, the runtime engine 230 transmits query execution data of the executed runtime query execution plan 232 to a recommendation module 160. In one embodiment, the query execution data of the runtime QEP 232 is used to determine future query and QEP ratings of the recommendation module 160. The method ends at block 610.

While the foregoing is directed to embodiments of the present invention, other and further embodiments of the invention may be devised without departing from the basic scope thereof, and the scope thereof is determined by the claims that follow.

The invention claimed is:

1. A method comprising:
receiving an input query;
generating query candidates based on the input query;
determining ratings of the query candidates by:
    executing each query candidate using a runtime engine
      to obtain query execution data, the query execution data including at least execution time and resource usage statistics related to execution of the query candidate;

retrieving historical execution statistics for each candidate from a knowledge base;

feeding both the query execution data and the historical execution statistics into a machine learning model that is trained to generate a numerical performance score for each candidate, wherein the machine learning model operates on features extracted from the logical structure of each candidate query;

selecting a primary query of the query candidates based on the ratings of the query candidates;

comparing a rating of the primary query to a query threshold; and generating a recommended query based on the rating.

2. The method of claim 1, wherein upon determining that the rating of the primary query exceeds the query threshold, the recommended query is generated based on the primary query.

3. The method of claim 1, wherein upon determining that the rating of the primary query does not exceed the query threshold, a rewritten query is generated based on the input query, and wherein the recommended query is generated based on the rewritten query.

4. The method of claim 1, further comprising:

generating query execution plan candidates based on a recommended query;

rating the query execution plan candidates by executing each candidate using a runtime engine on a statistical sample of data, retrieving historical execution statistics from a knowledge base, and feeding both into a machine learning model operating on features extracted from the logical structure of each candidate query;

selecting a primary query execution plan of the query execution plan candidates based on the ratings of the query execution plan candidates;

comparing a rating of the primary query execution plan to a plan threshold; and generating a runtime query execution plan based on the rating.

5. The method of claim 4, wherein upon determining that the rating of the primary query execution plan exceeds the plan threshold, the runtime query execution plan is generated based on the primary query execution plan.

6. The method of claim 4, further comprising:

upon determining that the rating of the primary query execution plan does not exceed the plan threshold, generating a potential query candidate based on the recommended query;

generating an optimizer query execution plan based on the recommended query, wherein the runtime query execution plan is generated based on the optimizer query execution plan; and generating a potential query execution plan based on the optimizer query execution plan.

7. The method of claim 4, further comprising:

receiving the runtime query execution plan, wherein the runtime query execution plan includes the primary query execution plan or an optimizer query execution plan;

executing the runtime query execution plan, wherein the query execution data is generated during the execution of the runtime query execution plan, wherein the query execution data includes at least one of: an actual or estimated execution time of the input query, an actual or estimated resource usage of an execution of the input query, an actual or estimated resource usage delay during the execution of the input query, or query execution statistics; and transmitting the query execution data of the executed runtime query execution plan to a global query optimization module, wherein post-execution statistics are automatically fed back into the knowledge base and used to retrain the machine learning model.

8. A system, comprising:

a processor; and memory or storage comprising an algorithm or computer instructions, which when executed by the processor, performs an operation comprising:

receiving an input query;

generating query candidates based on the input query;

determining ratings of the query candidates by:

executing each query candidate using a runtime engine to obtain query execution data, the query execution data including at least execution time and resource usage statistics related to execution of the query candidate;

retrieving historical execution statistics for each candidate from a knowledge base;

feeding both the query execution data and the historical execution statistics into a machine learning model that is trained to generate a numerical performance score for each candidate, wherein the machine learning model operates on features extracted from the logical structure of each candidate query; and selecting a primary query of the query candidates based on the ratings of the query candidates;

comparing a rating of the primary query to a query threshold; and generating a recommended query based on the rating.

9. The system of claim 8, wherein upon determining that the rating of the primary query exceeds the query threshold, the recommended query is generated based on the primary query.

10. The system of claim 8, wherein upon determining that the rating of the primary query does not exceed the query threshold, a rewritten query is generated based on the input query, and wherein the recommended query is generated based on the rewritten query.

11. The system of claim 8, the operation further comprising:

generating query execution plan candidates based on a recommended query;

rating the query execution plan candidates by executing each candidate using a runtime engine on a statistical sample of data, retrieving historical execution statistics from a knowledge base, and feeding both into a machine learning model operating on features extracted from the logical structure of each candidate query;

selecting a primary query execution plan of the query execution plan candidates based on the ratings of the query execution plan candidates;

comparing a rating of the primary query execution plan to a plan threshold; and generating a runtime query execution plan based on the rating.

12. The system of claim 11, wherein upon determining that the rating of the primary query execution plan exceeds the plan threshold, the runtime query execution plan is generated based on the primary query execution plan.

13. The system of claim 11, the operation further comprising:

upon determining that the rating of the primary query execution plan does not exceed the plan threshold, generating a potential query candidate based on the recommended query;

generating an optimizer query execution plan based on the recommended query, wherein the runtime query execution plan is generated based on the optimizer query execution plan; and generating a potential query execution plan based on the optimizer query execution plan.

14. The system of claim 11, the operation further comprising:

receiving the runtime query execution plan, wherein the runtime query execution plan includes the primary query execution plan or an optimizer query execution plan;

executing the runtime query execution plan, wherein query execution data is generated during the execution of the runtime query execution plan, wherein the query execution data includes at least one of: an actual or estimated execution time of the input query, an actual or estimated resource usage of an execution of the input query, an actual or estimated resource usage delay during the execution of the input query, or query execution statistics; and transmitting the query execution data of the executed runtime query execution plan to a global query optimization module, wherein post-execution statistics are automatically fed back into the knowledge base and used to retrain the machine learning model.

15. A computer-readable storage medium having a computer-readable program code embodied therewith, the computer-readable program code executable by one or more computer processors to perform an operation comprising:

receiving an input query;

generating query candidates based on the input query;

determining ratings of the query candidates by:

executing each query candidate using a runtime engine on to obtain query execution data, the query execution data including at least execution time and resource usage statistics related to execution of the query candidate;

retrieving historical execution statistics for each candidate from a knowledge base;

feeding both the query execution data and the historical execution statistics into a machine learning model that is trained to generate a numerical performance score for each candidate, wherein the machine learning model operates on features extracted from the logical structure of each candidate query;

comparing the numerical performance score for each candidate to a multi-dimensional query threshold comprising upper bounds on both predicted execution time and aggregate resource consumption; and selecting a primary query of the query candidates based on the ratings of the query candidates;

comparing a rating of the primary query to a query threshold; and generating a recommended query based on the rating.

16. The computer-readable storage medium of claim 15, wherein upon determining that the rating of the primary query exceeds the query threshold, the recommended query is generated based on the primary query.

17. The computer-readable storage medium of claim 15, wherein upon determining that the rating of the primary query does not exceed the query threshold, a rewritten query is generated based on the input query, and wherein the recommended query is generated based on the rewritten query.

18. The computer-readable storage medium of claim 15, the operation further comprising:

generating query execution plan candidates based on a recommended query;

rating the query execution plan candidates by executing each candidate using a runtime engine on a statistical sample of data, retrieving historical execution statistics from a knowledge base, and feeding both into a machine learning model operating on features extracted from the logical structure of each candidate query;

selecting a primary query execution plan of the query execution plan candidates based on the ratings of the query execution plan candidates;

comparing a rating of the primary query execution plan to a plan threshold; and generating a runtime query execution plan based on the rating.

19. The computer-readable storage medium of claim 18, wherein upon determining that the rating of the primary query execution plan exceeds the plan threshold, the runtime query execution plan is generated based on the primary query execution plan.

20. The computer-readable storage medium of claim 18, the operation further comprising:

upon determining that the rating of the primary query execution plan does not exceed the plan threshold, generating a potential query candidate based on the recommended query;

generating an optimizer query execution plan based on the recommended query, wherein the runtime query execution plan is generated based on the optimizer query execution plan; and generating a potential query execution plan based on the optimizer query execution plan.

21. The computer-readable storage medium of claim 18, the operation further comprising:

receiving the runtime query execution plan, wherein the runtime query execution plan includes the primary query execution plan or an optimizer query execution plan;

executing the runtime query execution plan, wherein query the execution data is generated during the execution of the runtime query execution plan, wherein the query execution data includes at least one of: an actual or estimated execution time of the input query, an actual or estimated resource usage of an execution of the input query, an actual or estimated resource usage delay during the execution of the input query, or query execution statistics; and transmitting the query execution data of the executed runtime query execution plan to a global query optimization module, wherein post-execution statistics are automatically fed back into the knowledge base and used to retrain the machine learning model.

22. A system, comprising:

a processor; and memory or storage comprising an algorithm or computer instructions, which when executed by the processor, performs an operation comprising:

generating query execution plan candidates based on a recommended query;

rating the query execution plan candidates by:

executing each candidate using a runtime engine to obtain query execution data, the query execution data including at least execution time and resource usage statistics related to execution of the query candidate;

retrieving historical execution statistics for each candidate from a knowledge base;

feeding both the query execution data and the historical execution statistics into a machine learning model that is trained to generate a numerical performance score for each candidate, wherein the machine learning model operates on features extracted from the logical structure of each candidate query;

selecting a primary query execution plan of the query execution plan candidates based on the ratings of the query execution plan candidates;

comparing a rating of the primary query execution plan to a plan threshold; and generating a runtime query execution plan based on the rating.

23. The system of claim 22, the operation further comprising:

receiving an input query;

generating query candidates based on the input query;

determining ratings of the query candidates by:

executing each query candidate using a runtime engine on a statistical sample of data to obtain current-run execution statistics;

retrieving historical execution statistics for each candidate from a knowledge base;

feeding both the query execution data and the historical execution statistics into a machine learning model that is trained to generate a numerical performance score for each candidate, wherein the machine learning model operates on features extracted from the logical structure of each candidate query;

comparing the numerical performance score for each candidate to a multi-dimensional query threshold comprising upper bounds on both predicted execution time and aggregate resource consumption; and automatically feeding post-execution statistics from the runtime engine back into the knowledge base and retraining the machine learning model based on updated statistics;

selecting a primary query of the query candidates based on the ratings of the query candidates; and comparing a rating of the primary query to a query threshold, wherein the recommended query is generated based on the rating.

24. A computer-readable storage medium having a computer-readable program code embodied therewith, the computer-readable program code executable by one or more computer processors to perform an operation comprising:

generating query execution plan candidates based on a recommended query;

rating the query execution plan candidates by:

executing each candidate using a runtime engine to obtain query execution data, the query execution data including at least execution time and resource usage statistics related to execution of the query candidate;

retrieving historical execution statistics for each candidate from a knowledge base;

feeding both the query execution data and the historical execution statistics into a machine learning model that is trained to generate a numerical performance score for each candidate, wherein the machine learning model operates on features extracted from the logical structure of each candidate query;

selecting a primary query execution plan of the query execution plan candidates based on the ratings of the query execution plan candidates;

comparing a rating of the primary query execution plan to a plan threshold; and generating a runtime query execution plan based on the rating.

25. The computer-readable storage medium of claim 24, the operation further comprising:

receiving an input query;

generating query candidates based on the input query;

determining ratings of the query candidates by:

executing each query candidate using a runtime engine on a statistical sample of data to obtain current-run execution statistics;

retrieving historical execution statistics for each candidate from a knowledge base;

feeding both the query execution data and the historical execution statistics into a machine learning model that is trained to generate a numerical performance score for each candidate, wherein the machine learning model operates features extracted from the logical structure of each candidate query; and automatically feeding post-execution statistics from the runtime engine back into the knowledge base and retraining the machine learning model based on updated statistics;

selecting a primary query of the query candidates based on the ratings of the query candidates; and comparing a rating of the primary query to a query threshold, wherein the recommended query is generated based on the rating.

* * * * *